United States Patent [19]

Rosansky

[11] 4,175,166
[45] Nov. 20, 1979

[54] SEALED CONTAINER CONSTRUCTION CAPABLE OF SAFELY VENTING INTERNAL PRESSURE

[75] Inventor: Martin G. Rosansky, Mt. Vernon, N.Y.

[73] Assignee: Power Conversion, Inc., Mount Vernon, N.Y.

[21] Appl. No.: 902,031

[22] Filed: May 2, 1978

[51] Int. Cl.² ............................................. H01M 2/12
[52] U.S. Cl. ...................................... 429/56; 429/176
[58] Field of Search .................... 429/56, 176, 72; 361/433

[56] References Cited

U.S. PATENT DOCUMENTS

| | | | |
|---|---|---|---|
| 2,274,327 | 2/1942 | Georgieu et al. | 361/433 |
| 2,525,436 | 10/1950 | Williams, Jr. | 429/56 |
| 3,204,156 | 8/1965 | Moresi, Jr. et al. | 361/433 |
| 3,401,314 | 9/1968 | Steele, Jr. | 361/433 |
| 3,688,162 | 8/1972 | Willy et al. | 429/56 X |
| 3,878,440 | 4/1975 | Ando | 361/433 |

Primary Examiner—Anthony Skapars
Attorney, Agent, or Firm—Hopgood, Calimafde, Kalil, Blaustein & Lieberman

[57] ABSTRACT

A sealed electrical energy storage container is provided which is cylindrical in shape and has upstanding sidewalls of generally uniform thickness. The upstanding sidewalls of the container include at least one area of reduced sidewall thickness and the reduced sidewall thickness area is designed to rupture in response to predetermined circumferential stresses occurring within the cylindrical container. The circumferential stresses occurring within the cylindrical container can be concisely calculated, allowing the thickness of the reduced thickness area to also be calculated, such that container venting will occur in response to a concise and predetermined internal pressure within the container.

5 Claims, 3 Drawing Figures

SEALED CONTAINER CONSTRUCTION CAPABLE OF SAFELY VENTING INTERNAL PRESSURE

FIELD OF THE INVENTION

This invention relates to electrical energy storage containers, and more particularly to an improved storage container which includes an area of reduced thickness within the sidewalls of the container to provide a safety release for internal pressure.

DESCRIPTION OF THE PRIOR ART

A persistant problem associated with the design of many types of sealed batteries is that under certain conditions the internal pressure generated by the electrochemical system contained within the sealed battery container is such that the container may explode. This pressure may be produced by chemical reaction or by the expansion of gases within the container due to the presence of excessive heat. Alternatively, battery containers may explode if short circuited, if recharged too rapidly, or if recharged over an extended period of time. A similar problem also occurs with many types of electrolytic capacitors. When electrolytic capacitors are subjected to heat the electrolyte liquid within the capacitor container gives off gases thus building up internal pressure within the capacitor container which can cause the capacitor container to explode. Capacitor containers may also become overheated and explode if subjected to voltages and/or currents beyond their maximum ratings. The occurrence of explosions due to the buildup of internal pressure within a sealed container, although not of a frequent occurrence, and although not necessarily dangerous, can be dangerous where the internal chemicals are caustic.

It is therefore, a general object of this invention to prevent the occurrence of explosions in sealed battery and/or capacitor containers.

It is another object of this invention to provide a technique for preventing the explosion of sealed battery and/or capacitor containers which is both inexpensive and adaptable to simple manufacturing processes.

Various methods of preventing the explosion of sealed containers are known in the art. One such method is described in U.S. Pat. No. 2,525,436 granted to F. D. Williams, Jr. on Oct. 10, 1950. The invention described in this patent seeks to prevent the explosion of battery containers by providing for the release of excessive pressure buildup within the container. Pressure release is accomplished by cutting or impressing a pair of crossed chisel grooves on the bottom wall of the battery container which rupture in response to excessive internal pressure. The patent specifies that the crossed grooves should extend across approximately $\frac{1}{3}$ of the diameter of the bottom wall and penetrate to a depth of about 75% to 85% of the bottom wall thickness. Additionally, it is specified that the grooves cross each other at an angle of approximately 60°.

This patent, although providing a method for venting pressure within the battery container does not fully solve the problem. Its disadvantage is the fact that the pressure release parameter (i.e., the depth of the grooves) cannot be precisely determined and is subject to considerable variation. The result is venting at unkown and perhaps undesired ranges of internal pressure. Therefore, the use of such a method for venting battery containers can result in inadvertant pressure release when the pressure has not yet reached a dangerous level and more particularly, pressure release may not occur until the pressure within the container has reached a dangerous level thus causing injury when pressure release finally does occur.

A method for venting capacitor containers is described in U.S. Pat. No. 3,401,314 granted to J. E. Steele, Jr. on Sept. 10, 1968. This patent describes a technique for venting internal pressure which consists of forming a relatively thin cross-sectional area into the bottom cover of the capacitor container. This thin cross-sectional area is designed to burst in response to the buildup of excess pressure within the capacitor container. However, again, one cannot calculate the venting pressure and thus this procedure suffers from the same disadvantages described above.

It is therefore, another object of this invention to provide a technique for safely venting a battery or capacitor container in which venting pressure can be concisely calculated.

It is a further object of this invention to provide a sealed container venting technique which will vent at a predetermined optimum internal pressure and will not vent prematurely or fail to vent in response to excess pressure within the container.

SUMMARY OF THE INVENTION

In accordance with the invention a sealed electrical energy storage container is provided which is cylindrical in shape and has upstanding sidewalls of generally uniform thickness. The upstanding sidewalls of the container include at least one area of reduced sidewall thickness and the reduced sidewall thickness area is designed to rupture in response to predetermined circumferential stresses occuring within the cylindrical container. The circumferential stresses occuring within the cylindrical container can be concisely calculated, allowing the thickness of the reduced thickness area to also be calculated such that venting will occur in response to a concise and predetermined internal pressure within the container.

It is a feature of the invention that the reduced thickness area is formed into the sidewalls of the cylindrical container allowing the thickness of the reduced thickness area to be concisely calculated in response to known circumferential stresses occuring within the cylindrical container.

It is another feature of the invention that the reduced thickness area formed within the sidewalls contains a concave portion, said concave portion advantageously becoming convex in response to excess pressure within the container, whereby the concave to convex transition results in precise bursting at known internal pressures.

It is a further feature of the invention that the reduced thickness area allows the external cylindrical envelope to be maintained during venting.

The foregoing and other objects and features of this invention will be more fully understood from the following description of an illustrative embodiment thereof taking in conjunction with accompanying drawings.

DETAILED DESCRIPTION

Figure 1:
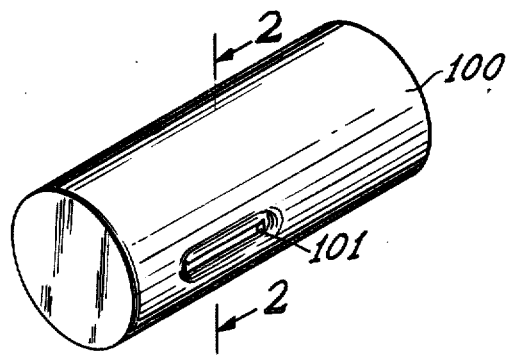
FIG. 1 illustrates a cylindrical container for batteries and/or electrolytic capacitors containing a safety venting groove in the upstanding sidewalls thereof.

A battery and/or electrolytic capacitor container capable of safely venting its contents without exploding and designed in accordance with this invention is shown in FIG. 1. More particularly, cylindrical container 100, can be utilized to contain various types of chemical batteries or alternatively can be utilized to contain an electrolytic capacitor. Included within the sidewalls of the cylindrical container is groove 101 which is an area of reduced thickness in the sidewalls of the cylindrical container designed to burst in response to a predetermined amount of circumferential stresses occuring within the container. As will be detailed hereinafter such circumferential stresses result from a buildup of pressure within the sealed container and the amount of stress can be concisely calculated.

The venting groove or reduced thickness area indicated at 101 in FIG. 1 can be formed in a number of ways. One method includes placing a mandrel inside the cylindrical container adjacent to the lower surface of the sidewall at the point wherein it is desired to form the venting groove. The mandrel used is preferably a cylindrical mandrel having a flat spot thereon of approximately 0.50 to 2.00 inches in length and 0.125 to 1.00 inches in width. Subsequent to insertion of the mandrel within the cylindrical container a punch or a similar device used to apply a controlled force is utilized adjacent to the upper surface of the mandrel and on the opposite side of the cylindrical sidewall to form the groove within the upstanding sidewall. Utilization of a cylindrical mandrel with a predetermined flat spot thereon, allows formation of the venting groove, of approximately ¼ inch in length and 0.030 inches in width, without causing bulging of the sidewall material on either side of the formed groove. It is to be understood that while the described parameters are preferable the length of the groove need only be sufficient to insure that calculated circumferential stresses (to be detailed hereinafter) play a major role in bursting the venting groove. Also the groove should not be of extended length so as to diminish controlled venting. Adequate groove width can vary from 0.01 to 0.06 inches.

Additionally, the use of a mandrel with a flat spot thereon causes the container sidewall to become concave as the groove is formed and as will be hereinafter described, this concave formation allows the occurrence of a concave to convex transition to occur upon bursting which results in an even more uniform bursting at predetermined internal pressures. This transition while preferable is not deemed mandatory.

Figure 2:
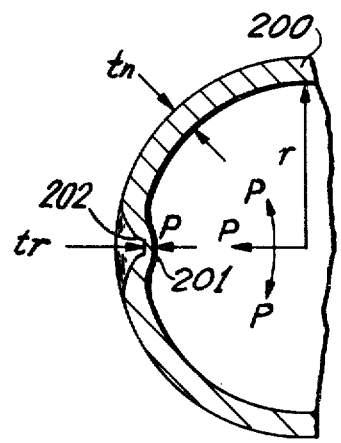
FIG. 2 illustrates a cross-sectional view of the cylindrical sidewall taken along line 2—2 in FIG. 1 and showing an enlarged view of the safety venting groove.

Refer to FIG. 2. There is shown a cross-sectional area of a cylindrical sidewall taken along the line 2—2 in FIG. 1. More particularly, section 200 includes therein a reduced thickness area 202 which has been formed in the cylinder sidewall in the manner described above. The cylinder sidewall section shown in FIG. 2 has a normal uniform thickness $t_n$ illustrated by legend in FIG. 2 and a reduced thickness area $t_r$ which is less than the normal thickness of the cylinder sidewall. The internal radius of the cylinder is indicated by legend as being equal to "r" in FIG. 2. Also illustrated in FIG. 2 are pressure arrows "P" which illustrate the existence of internal pressure within the cylinder.

The problem of circumferential stresses occurring within cylindrical pressure vessels has been previously considered in various publications. More particularly, it has been determined that the walls of an ideal thin walled pressure vessel act as a membrane in that no bending of the walls takes place when the walls are subjected to internal pressure. In the absence of bending the average circumferential or hoop stress occurring in thin wall cylinders can be readily calculated. The circumferential stress, or hoop stress, occurring at any point within the sidewalls of a cylindrical vessel can be expressed by the following relationship:

$$S = Pr/t$$

Where S equals circumferential stress, "r" equals the internal cylinder radius, "P" equals venting pressure when ultimate stress is reached and "t" equals sidewall thickness at the venting point.

The expression described above can be utilized to concisely calculate the desired thickness of the cylinder sidewall at the venting point such that this area of reduced thickness will rupture in response to a predetermined internal pressure within the cylinder.

At the venting pressure, i.e., the pressure that which it is desired for the reduced thickness area to burst, the circumferential stress should be equal to the ultimate tensile strength of the cylinder sidewall material. A typical battery "D" cell as shown in FIG. 1 has a diameter of 1.3 inches and an internal radius "r" equal to 0.65 inches. A typical desired venting pressure, P, (i.e., the pressure at which it is desired to rupture the reduced thickness area when ultimate stress is reached) is equal to 500 PSI, although this venting pressure may vary considerably depending upon wall material and intended use. The tensile strength of a typical battery sidewall material is equal to 60,000 PSI, which is the tensile strength for annealed cold rolled steel. Utilizing these typical values and the relationship described above, the desired wall thickness at the venting point can be derived. More particularly:

$$t = Pr/S = [(500 \text{ PSI})(0.65 \text{ in.})]/60,000 \text{ PSI}$$

Solving this expression, it can be seen that "t" is equal to 0.0054 inches which is the desired thickness of the reduced thickness area such that the reduced thickness area will rupture in response to an internal pressure of 500 PSI.

Utilising the above expression, it is possible to concisely calculate the internal pressure at which the reduced thickness area will rupture. It can be readily seen that calculations can be made such that rupture will occur at any desired internal pressure once the tensile strength of the sidewall material utilized in cylinder construction is known. The foregoing therefore, illustrates a technique for concisely calculating the circumferential stresses within a cylinder and using those stresses it is possible to calculate the thickness of a reduced thickness area in the cylinder sidewall. This technique ensures that rupture or bursting occurs at a predetermined pressure and does not occur inadvertantly in response to less than the predetermined pressure or alternatively does not occur at a delayed point such that pressure buildup is excessive and results in injury or damage to surrounding equipment or personnel.

The safety venting technique described above is designed to mechanically relieve an overpressurized cylinder at a predetermined level of internal pressure by utilization of the calculated circumferential stresses occuring within the cylinder. Venting pressure therefore, is controlled by the thickness of the reduced thickness area and the tensile strength of the cylinder sidewall material. This in marked contrast to the prior art systems described above wherein grooves, or thin areas were formed into the end section of a cylinder. These grooves or thin areas were designed to burst in response to an internal pressure. However, due to the fact that the grooves or thin areas were formed in the bottom walls of the container the concept of circumferential stress could not be used to calculate groove depth or area thickness. Therefore, groove depth or area thickness had to be determined through experimental use, giving rise to the possibility of, premature or late bursting which could cause damage to surrounding personnel or equipment.

Figure 3:
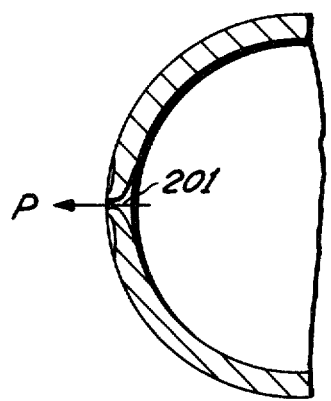
FIG. 3 illustrates a segment of the cylinder sidewall illustrating the safety venting groove subsequent to rupture.

Refer now to FIG. 3. Therein is illustrated the cylinder sidewall section subsequent to rupture of the reduced thickness area. It is of particular importance to note that the concave area at 201 in FIG. 2 has become convex as a result of the rupture of the reduced thickness area. This concave to convex transition, which occurs at bursting, contributes to, and it is a factor in, the ability to precisely determine the pressure at which rupture occurs. This result stems from the fact that the concave formation within the cylinder sidewall provides a focus point on which the circumferential stresses are concentrated and this focus point is adjacent to and part of the reduced thickness area in the sidewall. Therefore the use of a concave portion within the reduced thickness area essentially provides a focus point for the calculated circumferential stress, allowing bursting to occur at the predetermined pressure value.

Although a specific embodiment of this invention has been shown and described it will be understood that various modifications may be made without departing from the spirit of the invention.

I claim:

1. A sealed electrical energy storage container being cylindrical in shape and having an internal cylindrical radius, r, said container being arranged to safely vent its contents at a predetermined internal pressure, P, and said container comprised of a material having an ultimate tensile strength, S, characterized by, said container sidewalls being of generally uniform thickness and having at least one area of reduced thickness, t, wherein $t=Pr/S$, whereby said area of reduced thickness ruptures at pressure P to safely vent the storage container contents.

2. A sealed electrical energy storage container in accordance with claim 1, wherein the area of reduced thickness is 0.5 inch to 2.0 inches in length and 0.125 inches to 1.00 inches in width.

3. A sealed electrical energy storage container in accordance with claim 1 wherein said area of reduced sidewall thickness includes a concave portion prior to rupture.

4. A sealed electrical energy storage container in accordance with claim 3 wherein said concave portion becomes convex subsequent to rupture.

5. A sealed electrical energy storage container being cylindrical in shape and comprised of a material having an ultimate tensile strength S, said container having an internal radius r and having upstanding sidewalls of generally uniform thickness, said container sidewalls having at least one area of reduced thickness t, said area of reduced thickness comprised of a concave portion on the exterior of said container sidewalls, said concave portion being arranged to become convex and rupture in response to a predetermined internal container pressure P, said thickness to being equal to Pr/S.

* * * * *